3,017,922
FUEL SUPPLY SYSTEM WITH PRESSURE BALANCED ACCUMULATOR TO CONTROL FUEL SURGES
Gudmundur Peter Peterson, St. Hilaire, Quebec, Canada, assignor to Canadian Pratt & Whitney Aircraft Company Limited, Montreal, Quebec, Canada
Filed Apr. 28, 1960, Ser. No. 25,323
Claims priority, application Great Britain Apr. 30, 1959
4 Claims. (Cl. 158—36.3)

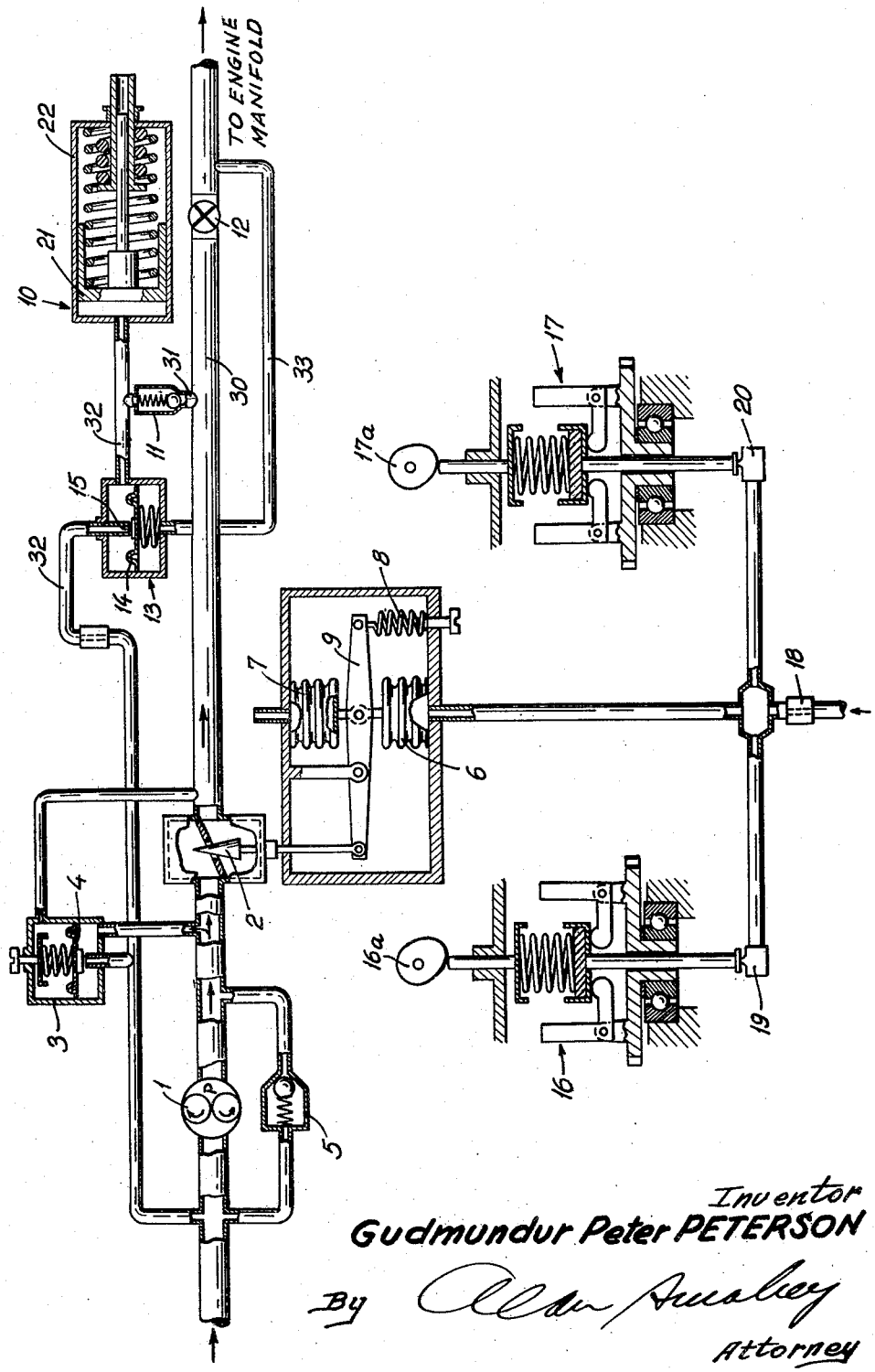

The present invention relates to fuel supply systems for gas turbines and to a means for controlling excess scheduled fuel under engine accelerations for use in such systems.

Fuel supply systems for gas turbines have become increasingly complicated especially where they are intended for use in gas turbine aircraft engines.

In practice it is found that during accelerations every such engine requires departure from a fixed ratio of fuel flow to compressor delivery pressure to some extent and at certain engine speeds will only tolerate a value of this ratio which is a good deal lower than the value of the ratio required for other engine speeds. It is difficult to design a simple fuel supply system for small engines which is capable of matching the value of this ratio to the tolerance of the engine at any given engine speed and therefore a fixed ratio is selected. The value of this ratio must provide the maximum which the engine will require under any steady state condition. This means that under most accelerating conditions there is available more fuel than the engine can cope with, which can cause a good deal of difficulty and moreover may be dangerous.

According to the present invention means are provided for diverting this excess fuel to an accumulator which stores it and does not allow it to be delivered to the engine.

The present invention is embodied in a fuel supply system for gas turbines which includes a pump for supplying the fuel, a metering valve for metering the supply of fuel, a pressure drop regulating valve for ensuring a constant pressure drop across said metering valve, a compensating device whereby the operation of said metering valve is modified to compensate for fluctuations in the compressor delivery pressure, and means for diverting to an accumulator the excess scheduled fuel so that it does not enter the engine directly on accelerations.

A main feature of the invention is the incorporation into such a fuel supply system of an accumulator having a ready capacity for storing excess metered fuel during engine accelerations. More specifically, in a preferred arrangement in accordance with the invention the accumulator consists of a spring loaded piston-cylinder assembly connected into the fuel conduit leading to the engine manifold with means in the form of a check valve preventing return flow from the accumulator to the manifold. A pressure balancing valve arrangement is connected to the accumulator controlling the return flow from the accumulator to the pump and a pressure sensing conduit is provided between the pressure balancing valve and the engine manifold so as to convey a pressure signal to the balancing valve whereby the pressure within the accumulator cylinder is controlled so that it is at maximum no greater than the pressure within the fuel manifold. With this arrangement, any excess stored fuel in the accumulator cylinder is returned to the pump inlet and the accumulator is ready at all times to provide a capacity to absorb excess metered fuel delivered from the metering valve system to the fuel manifold. In other words, the accumulator assembly is adapted to be in constant condition to act in the manner of a surge tank, preventing sudden increases in manifold pressure and the accompanying sudden excess increases in fuel flow to the engine.

The invention can be applied to fuel supply systems for use for example in aircraft engines and gas producers and industrial gas turbines.

Having thus generally described the nature of the invention particular reference will be made to the accompanying drawing showing by way of illustration a preferred embodiment thereof, and in which:

The figure is a diagrammatic illustration of a fuel supply system embodying an accumulator assembly in accordance with the invention and suitable for use for example in aircraft free shaft turboprop and turbojet engines, as well as on free shaft helicopter turboshaft engines and gas producers.

Referring to the figure a fuel pump 1 serves to supply fuel into a metering valve assembly 2. A pressure regulating valve 3 serves to regulate the metering head across the metering valve 2 so that the metered flow is directly proportional to the metering area. The pressure drop across the metering valve 2 is sensed by a spring loaded diaphragm 4 (which may be replaced by a piston) which so controls the metering valve as to allow the excess flow to return to the inlet to the fuel pump 1. Adjacent to the outlet from the fuel pump 1 there is located a pressure relief valve 5 which serves to limit the maximum delivery pressure of the fuel pump to a desired value. Should this desired value of the delivery pressure be exceeded the pressure relief valve 5 opens and allows fuel to return to the inlet side of the fuel pump 1.

The metering valve arrangement shown at 2 consists of a suitable mechanism by which the metering orifice may be varied. This may, for example, be a sharp-edged orifice and tapered plunger as shown in FIGURE 1, an orifice plate and mask, or a throttle sleeve with appropriately arranged perforations. The most important characteristic of this valve is that the effective flow area must be proportional to the control pressure in the air bellows 6. The air bellows 6, vacuum bellows 7, spring 8 and control arm 9 are all a part of the metering valve assembly. By suitable geometry of these components, the desired relationship between the metering area and control air pressure may be attained, that is, the ratio of metering area (i.e. fuel flow) to compressor delivery pressure is constant. A suitable metering valve assembly for this purpose is described in detail in the applicant's co-pending application, Serial No. 25,311, filed April 28, 1960.

As previously explained, most engines cannot accelerate safely with a fixed ratio of fuel flow to compressor delivery pressure and according to the invention means are provided to divert all of the excess scheduled fuel so that it does not enter the engine. This is accomplished by providing an accumulator assembly 10. This assembly consists essentially of a spring-loaded piston 21 mounted within a cylinder 22.

In operation the excess fuel enters the accumulator via check valve 11 which is downstream from the metering valve 2. In the system shown a conduit 30 leads from the metering valve assembly 2 to the engine manifold (not illustrated). A further conduit 31 leads from the conduit 30 to the cylinder 22 of the accumulator and the check valve 11 is connected into this conduit. The check valve 11 prevents return flow from the accumulator to the engine.

A further conduit 32 leads from the cylinder 22 of the accumulator to the inlet side of the fuel pump 1 and the fuel pressure in the accumulator is maintained at the same level as that in the main fuel line downstream of the shut-off cock 12 by the action of a pressure balancing valve 13 located in the conduit 32. As shown, a pressure sensing conduit 33 extends from the balancing valve 13 to the conduit 30 leading to the engine fuel manifold. It may be desirable to have some preload in the pressure balancing and check valves for stability reasons. This can be accomplished by spring loading these valves to the desired value.

The pressure balancing valve 13 maintains the required accumulator pressure by bypassing the excess fuel stored back to the inlet side of the fuel pump 1 when the pressure in the main system is dropping (as during deceleration) until the two pressures are equal or within the specified limits. When the accumulator pressure is higher than the manifold pressure the diaphragm 14 will move in such a way as to uncover a discharge port 15 allowing fuel to escape to pump inlet, thereby reducing the accumulator pressure and stored volume. It is essential that the accumulator pressure is preferably no greater than or at worst does not exceed the main fuel line (manifold) pressure by so large an amount that, in case of a sudden increase in metered flow, the accumulator is unable to take up the excess fuel because the accumulator is not yet sufficiently emptied. This is accomplished by making the check valve 11 sufficiently sensitive to pressure difference so as to allow flow to the accumulator under a relatively slight pressure difference between the fuel manifold and the accumulator. A necessary characteristic of the accumulator is that it must be capable of discharging enough fuel in the time available during a maximum rate of deceleration to be able to take up the excess fuel on the next acceleration.

The accumulator characteristics are determined from the engine acceleration and fuel control characteristics. The required fuel storage versus pressure relationship is obtained by integrating the fuel scheduled during accelerations with respect to time and subtracting from this value the integrated fuel acceptable by the engine during acceleration. The difference must be stored in the accumulator. In order to obtain the maximum allowable accelerations under all conditions it would be necessary to alter the accumulator pressure versus volume relationship, but analysis shows that quite small penalties in acceleration times are encountered by using fixed accumulator characteristics over the operating range for small aircraft or ground running engines. The accumulator size and spring rate are determined by the minimum ambient pressure conditions. This produces an accumulator size that is larger than the optimum for conditions which are favorable for rapid engine accelerations.

In the system illustrated and in the shut-off position, the shut-off valve 12 prevents flow of fuel to the engine manifold but provides a passage from the fuel manifold to drain (not shown) so that the manifold is completely drained on shut-down. In the open position the drain port is closed off and a passage is provided for the fuel to the fuel manifold.

There are two identical speed governors shown on the drawing as being a gas generator speed governor 16 and a power turbine speed governor 17 both of which are resettable to select the desired speed, for example by rotary cams 16a—17a shown. Each speed governor system operates an air valve in an air potentiometer. Compressor delivery pressure is fed into the potentiometer via a restrictor 18. When either the gas generator governor air valve 19 or the power turbine governor air valve 20 is opened, the air pressure in the potentiometer is lowered. This pressure is sensed by the control bellows 6 in the metering system. Since full compressor delivery pressure into the control bellows 6 would result in too high a fuel flow for steady state running, the gas generator governor air valve 19 will be partly open to maintain the selected speed. Upon advancing the power lever for more speed, the gas generator governor 16 will close the air valve 19 until the required speed is attained. When the air valve 19 is closed, pressure will build up in the control bellows 6 and fuel flow will increase causing the engine to accelerate.

The power turbine speed governor 17 will actuate air valve 20 only when the speed of the power shaft exceeds the value for which the governor is set. Its action on the fuel metering valve 2 will be identical to that of gas generator governor 16.

On decelerations the gas generator air valve 19 will be fully opened reducing the control air pressure and, therefore, the fuel flow. The amount of pressure reduction is limited by the ratio of the size of restrictor 18 to gas generator governor air valve size 19. This should be arranged so that safe limits of reduction will not be exceeded. If this reduction is too great, as previously stated, the engine will flame out.

The control arrangement provided is capable of controlling engine accelerations so as to avoid surging the compressor and overheating the engine. It will also maintain sufficient flow, even during the most rapid decelerations, to prevent flame-out in the engine combustion chambers. The control arrangement will also maintain selected speed during steady state running even though environmental conditions may vary.

I claim:

1. A pressure balanced fuel system for gas turbine engines comprising in combination with a fuel pump, a metering valve system and a fuel manifold; a pressure balanced fuel accumulator connected between said metering valve system and said fuel manifold, pressure controlled means for diverting to said accumulator excess metered fuel delivered from said metering valve system to said manifold, a fuel line connecting said pump, metering valve, pressure controlled means and said manifold, and pressure sensitive control means for returning excess fuel stored within said accumulator to said fuel pump, said pressure sensitive control means being responsive to fluid pressure within said accumulator and fluid pressure within said manifold, whereby the pressure within said accumulator is maintained at a level no greater than the pressure within said manifold providing a capacity within said accumulator to absorb said excess metered fuel.

2. A pressure balanced fuel system as claimed in claim 1, wherein said pressure balanced accumulator comprises a spring-loaded piston within a cylinder.

3. A pressure balanced fuel system as claimed in claim 1, wherein said pressure controlled means for diverting said excess metered fuel to said accumulator comprises a check valve between said manifold and accumulator, said check valve being responsive to variations in said manifold pressure, and said pressure sensitive means controlling discharge from said accumulator to said pump comprises a pressure balanced valve having one accumulator pressure side connected into a conduit leading from said accumulator to said pump, the other side of said pressure balanced valve having a direct connection to said fuel manifold, subjecting it to manifold pressure, whereby when the pressure in said accumulator exceeds the pressure in said manifold said valve releases excess fuel stored in said accumulator to said pump.

4. In a fuel metering system for an engine and in combination with a fuel pump connected to a fuel manifold and a metering valve system between said pump and fuel manifold; an accumulator system pressure balanced to said engine fuel manifold and comprising, a spring-loaded piston within a cylinder, a first conduit leading to said accumulator cylinder from said engine manifold, a pressure sensitive check valve in said first conduit bypassing excess metered fuel to said accumulator cylinder and preventing return flow from said accumulator cylinder to said engine manifold, a second conduit leading from said accumulator cylinder to the inlet of said fuel pump, a pressure balancing valve in said second conduit controlling the flow from said accumulator cylinder to said pump inlet, said pressure balancing valve being regulated by a pressure signal conveyed by a third conduit leading directly from said balancing valve to said engine manifold, said pressure balancing valve maintaining the pressure within said cylinder no greater than the pressure within said fuel manifold, whereby any excess stored fuel in said accumulator cylinder will be returned to said pump inlet to provide a ready capacity within said accumulator cylinder to absorb excess metered fuel delivered from said metering valve system to said engine manifold.

References Cited in the file of this patent

UNITED STATES PATENTS

| | | |
|---|---|---|
| 2,401,883 | Pugh et al. | June 11, 1946 |
| 2,933,130 | Wright et al. | Apr. 19, 1960 |